United States Patent
Bayomi et al.

(10) Patent No.: US 12,217,001 B2
(45) Date of Patent: Feb. 4, 2025

(54) NATURAL LANGUAGE PROCESSING TECHNIQUES USING MULTI-CONTEXT SELF-ATTENTION MACHINE LEARNING FRAMEWORKS

(71) Applicant: Optum Services (Ireland) Limited, Dublin (IE)

(72) Inventors: Mostafa Bayomi, Dublin (IE); Ahmed Selim, Dublin (IE); Kieran O'Donoghue, Dublin (IE); Michael Bridges, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 273 days.

(21) Appl. No.: 17/733,522

(22) Filed: Apr. 29, 2022

(65) Prior Publication Data

US 2023/0306201 A1  Sep. 28, 2023

Related U.S. Application Data

(60) Provisional application No. 63/314,073, filed on Feb. 25, 2022.

(51) Int. Cl.
*G06N 3/0442* (2023.01)
*G06F 40/284* (2020.01)
(Continued)

(52) U.S. Cl.
CPC ............ *G06F 40/284* (2020.01); *G06F 40/30* (2020.01); *G06N 3/047* (2023.01)

(58) Field of Classification Search
None
See application file for complete search history.

(56) References Cited

U.S. PATENT DOCUMENTS 6,925,433 B2   8/2005  Stensmo
10,354,168 B2  7/2019  Bluche
(Continued)

FOREIGN PATENT DOCUMENTS

CN   110619045 A   12/2019

OTHER PUBLICATIONS

Peng-Hsuan Li,1 Tsu-Jui Fu,2 Wei-Yun Ma1, Why Attention? Analyze BiLSTM Deficiency and Its Remedies in the Case of NER, 2020, 1Academia Sinica, 2UC Santa Barbara The Thirty-Fourth AAAI Conference on Artificial Intelligence (AAAI-20) (Year: 2020).*
(Continued)

*Primary Examiner* — Pierre Louis Desir
*Assistant Examiner* — Kristen Michelle Masters
(74) *Attorney, Agent, or Firm* — Alston & Bird LLP

(57) ABSTRACT

Various embodiments of the present invention provide methods, apparatus, systems, computing devices, computing entities, and/or the like for performing natural language processing operations using a multi-context convolutional self-attention machine learning framework that comprises a shared token embedding machine learning model, a plurality of context-specific self-attention machine learning models, and a cross-context representation inference machine learning model, where each context-specific self-attention machine learning model is configured to generate, for each input text token of an input text sequence, a context-specific token representation using a context-specific self-attention mechanism that is associated with the respective distinct context window size for the context-specific self-attention machine learning model.

20 Claims, 10 Drawing Sheets

(51) Int. Cl.

| | |
|---|---|
| *G06F 40/30* | (2020.01) |
| *G06N 3/0464* | (2023.01) |
| *G06N 3/047* | (2023.01) |
| *G06N 3/09* | (2023.01) |
| *G06N 3/0985* | (2023.01) |

(56) References Cited

U.S. PATENT DOCUMENTS

| | | | |
|---|---|---|---|
| 10,388,272 | B1 | 8/2019 | Thomson et al. |
| 10,650,230 | B2 | 5/2020 | Johnson |
| 10,839,246 | B2 | 11/2020 | Chowdhury et al. |
| 10,957,433 | B2 | 3/2021 | Lucas et al. |
| 11,580,968 | B1 * | 2/2023 | Gupta ............... G10L 15/22 |
| 11,941,346 | B2 * | 3/2024 | Pang ............... G06F 40/166 |
| 2018/0129937 | A1 * | 5/2018 | Bradbury ............... G06N 3/044 |
| 2019/0188277 | A1 | 6/2019 | Mansar et al. |
| 2019/0228065 | A1 | 7/2019 | Lavallee et al. |
| 2020/0372217 | A1 | 11/2020 | Abuammar et al. |
| 2021/0183484 | A1 | 6/2021 | Shaib et al. |
| 2021/0201013 | A1 | 7/2021 | Makhija et al. |

OTHER PUBLICATIONS

Coquenet, Denis et al. "End-To-End Handwritten Paragraph Text Recognition Using A Vertical Attention Network," arXiv PrePrint arXiv:2012.03868v2 [cs.CV], Dec. 3, 2021, pp. 1-16.

Dai, Pengwen et al. SLOAN: Scale-Adaptive Orientation Attention Network For Scene Text Recognition, IEEE Transactions on Image Processing, vol. 30, Dec. 23, 2020, pp. 1687-1701.

Luo, Canjie et al. "MORAN: A Multi-Object Rectified Attention Network For Scene Text Recognition," arXiv PrePrint arXiv:1901.03003v1 [cs.CV], Jan. 10, 2019, pp. 1-15.

Sun, Xu et al. "Feature-Frequency-Adaptive On-Line Training For Fast and Accurate Natural Language Processing," Computational Linguistics, vol. 40, No. 3, Sep. 2014, pp. 563-586, DOI: https://doi.org/10.1162/COLI_a_00193.

Wang, Tianwei et al. "Decoupled Attention Network For Text Recognition," arXiv PrePrint arXiv:1912.10205v1 [cs.CV], Dec. 21, 2019, (9 pages).

Xie, Dong et al. "Novel Receipt Recognition With Deep Learning Algorithms," In Pattern Recognition and Tracking XXXI, Proceedings of SPIE vol. 11400, pp. 11400B-1-11400B-8, Apr. 22, 2020, DOI: 10.1117/12.2558206.

Extended European Search Report for European Patent Application No. 23157225.6, dated Jun. 16, 2023, (12 pages), European Patent Office, Munich, Germany.

Wang, Jia-Wei et al. "Text Classification Model Based On Convolutional Neural Network and Self-Attention Mechanism," Journal of Sichuan University (Natural Science Edition), vol. 57, No. 3, May 2020, (7 pages), DOI: 10.3969/j.issn.0490-6756.2020.03.009, XP093052682.

Zhou, Yuxiang et al. "A Discriminative Convolutional Neural Network With Context-Aware Attention," ACM Transactions On Intelligent Systems and Technology, Association For Computing Machinery, vol. 11, No. 5, Jul. 25, 2020, Article 57, pp. 1-21, DOI: 10.1145/3397464, XP058680028, ISSN: 2157-6904.

\* cited by examiner

500

'Siouxland Regional Cancer Center Patient Sandra Wieser Note Data 10113120 IT Menopause Age 50 Reason Natural Symptoms Hot ashes OBIGYN Medication Hx Contraceptive Hormonal Use Yes Years of Use 10 Currently Using No Most Recent Use 1970 Post Menopausal Hormonal Therapy No IUD No Other Contraceptive Hx No SOCIAL HISTORY Marital Status Divorced Smoking Status Former smoker stopped smoking 09129I2017 FAMILY HISTORY Father Deceased Mother comments deased at age 89 heart disease Deceased Brother 1 comments heart disease Alive and Well Brother 2 comments had heart surgery and got septic and this was cause of death Deceased Sister 1 comments on oxygen full time Alive and Well Sister 2 comments aneurysm and blood thinner Alive and Well Son 1 Alive and Well Hypertension Son 2 comments deceased due to aids Deceased Daughter 1 Alive and Well Grandfather Paternal 2nd Degree Deceased Grandmother Paternal 2nd Degree comments died at a young age Deceased Grandfather Maternal 2nd Degree comments had drug for his kidney s stroke Deceased Grandmother Maternal 2nd Degree comments age 94 of a stroke Deceased ALLERGIES No known medication allergies CURRENT MEDICATIONS Alprazolam Oral 0 5 mg tablet daily to bid Calcium Carbonate Oral daily Fish Oil Omega 3 Fatty Acids Oral 1 000 mg capsule tid Multivitamins Oral Tablet daily Nicoden n CO Nicotine Transdermal Patch 21 mgI24 hr daily Simvastatin Oral 20 mg tablet daily Triamterene Hydrochlorothiazide Oral 75 mg 50 mg daily Tylenol PM Extra Strength Diphenhydramine Acetaminophen Oral 25 mg 500 mg hs Vitamin B 12 Cyanocobalamin Oral daily Vitamin D ChoiecaicilerclOral daily VITAL SIGNS Blood pressure 140170 Pulse 76 Temperature 98 1 F Respirations 12 02 set Pain Scale 0 Height 61 5 in Weight 113 6 lb BSA 1 49 BMI 21 12 kglmz ECOG 0 Ncrrnal activity Fully active able to

Text:

*A pedigree of branchio-oto-renal dysplasia (the EI? syndrome) is reported including the documentation by serial satliotnefric stags of the Lwset and rapidprogression hearina kiss in the twth sister of an affected.*

Assigned Labels:
- Renal Dysplasia
- Assigned Progression
- Hearing Loss

FIG. 7

NATURAL LANGUAGE PROCESSING TECHNIQUES USING MULTI-CONTEXT SELF-ATTENTION MACHINE LEARNING FRAMEWORKS

CROSS-REFERENCES TO RELATED APPLICATION(S)

The present patent application claims priority to the U.S. Provisional Patent Application No. 63/314,073, filed on Feb. 25, 2022, which is incorporated by reference herein in its entirety.

BACKGROUND

Various embodiments of the present invention address technical challenges related to performing natural language processing and provide solutions to address the efficiency and reliability shortcomings of existing natural language processing solutions.

BRIEF SUMMARY

In general, various embodiments of the present invention provide methods, apparatus, systems, computing devices, computing entities, and/or the like for performing natural language processing operations using a multi-context convolutional self-attention machine learning framework that comprises a shared token embedding machine learning model, a plurality of context-specific self-attention machine learning models, and a cross-context representation inference machine learning model, where the shared token embedding machine learning model is configured to generate an initial token embedding for each input text token, each context-specific self-attention machine learning model is associated with a respective distinct context window size of a plurality of distinct context window sizes, each context-specific self-attention machine learning model is configured to generate, for each input text token of an input text sequence, a context-specific token representation based at least in part on each initial token embedding and using a context-specific self-attention mechanism that is associated with the respective distinct context window size for the context-specific self-attention machine learning model, and the cross-context representation inference machine learning model is configured to generate, for each input text token, a cross-context token representation based at least in part on each context-specific token representation generated for the input text token using the plurality of context-specific self-attention machine learning models.

In accordance with one aspect, a method is provided. In one embodiment, the method comprises: for each input text token, generating, using a multi-context self-attention machine learning framework and based at least in part on the input text token, a cross-context token representation, wherein: (i) the multi-context convolutional self-attention machine learning framework comprises a shared token embedding machine learning model, a plurality of context-specific self-attention machine learning models, and a cross-context representation inference machine learning model, (ii) the shared token embedding machine learning model is configured to generate an initial token embedding for each input text token, (iii) each context-specific self-attention machine learning model is associated with a respective distinct context window size of a plurality of distinct context window sizes, (iv) each context-specific self-attention machine learning model is configured to generate, for each input text token, a context-specific token representation based at least in part on each initial token embedding and using a context-specific self-attention mechanism that is associated with the respective distinct context window size for the context-specific self-attention machine learning model, and (v) the cross-context representation inference machine learning model is configured to generate, for each input text token, a cross-context token representation based at least in part on each context-specific token representation generated for the input text token using the plurality of context-specific self-attention machine learning models; generating, using a natural language processing machine learning model and based at least in part on each cross-context token representation, a natural language processing output for the input text sequence; and performing one or more prediction-based actions based at least in part on the natural language processing output.

In accordance with another aspect, an apparatus comprising at least one processor and at least one memory including computer program code is provided. In one embodiment, the at least one memory and the computer program code may be configured to, with the processor, cause the apparatus to: for each input text token, generate, using a multi-context self-attention machine learning framework and based at least in part on the input text token, a cross-context token representation, wherein: (i) the multi-context convolutional self-attention machine learning framework comprises a shared token embedding machine learning model, a plurality of context-specific self-attention machine learning models, and a cross-context representation inference machine learning model, (ii) the shared token embedding machine learning model is configured to generate an initial token embedding for each input text token, (iii) each context-specific self-attention machine learning model is associated with a respective distinct context window size of a plurality of distinct context window sizes, (iv) each context-specific self-attention machine learning model is configured to generate, for each input text token, a context-specific token representation based at least in part on each initial token embedding and using a context-specific self-attention mechanism that is associated with the respective distinct context window size for the context-specific self-attention machine learning model, and (v) the cross-context representation inference machine learning model is configured to generate, for each input text token, a cross-context token representation based at least in part on each context-specific token representation generated for the input text token using the plurality of context-specific self-attention machine learning models; generate, using a natural language processing machine learning model and based at least in part on each cross-context token representation, a natural language processing output for the input text sequence; and perform one or more prediction-based actions based at least in part on the natural language processing output.

In accordance with yet another aspect, a computer program product is provided. The computer program product may comprise at least one computer-readable storage medium having computer-readable program code portions stored therein, the computer-readable program code portions comprising executable portions configured to: for each input text token, generate, using a multi-context self-attention machine learning framework and based at least in part on the input text token, a cross-context token representation, wherein: (i) the multi-context convolutional self-attention machine learning framework comprises a shared token embedding machine learning model, a plurality of context-specific self-attention machine learning models, and a cross-context representation inference machine learning model, (ii) the shared token embedding machine learning model is configured to generate an initial token embedding for each input text token, (iii) each context-specific self-attention machine learning model is associated with a respective distinct context window size of a plurality of distinct context window sizes, (iv) each context-specific self-attention machine learning model is configured to generate, for each input text token, a context-specific token representation based at least in part on each initial token embedding and using a context-specific self-attention mechanism that is associated with the respective distinct context window size for the context-specific self-attention machine learning model, and (v) the cross-context representation inference machine learning model is configured to generate, for each input text token, a cross-context token representation based at least in part on each context-specific token representation generated for the input text token using the plurality of context-specific self-attention machine learning models; generate, using a natural language processing machine learning model and based at least in part on each cross-context token representation, a natural language processing output for the input text sequence; and perform one or more prediction-based actions based at least in part on the natural language processing output.

BRIEF DESCRIPTION OF THE DRAWINGS

Figure 1:
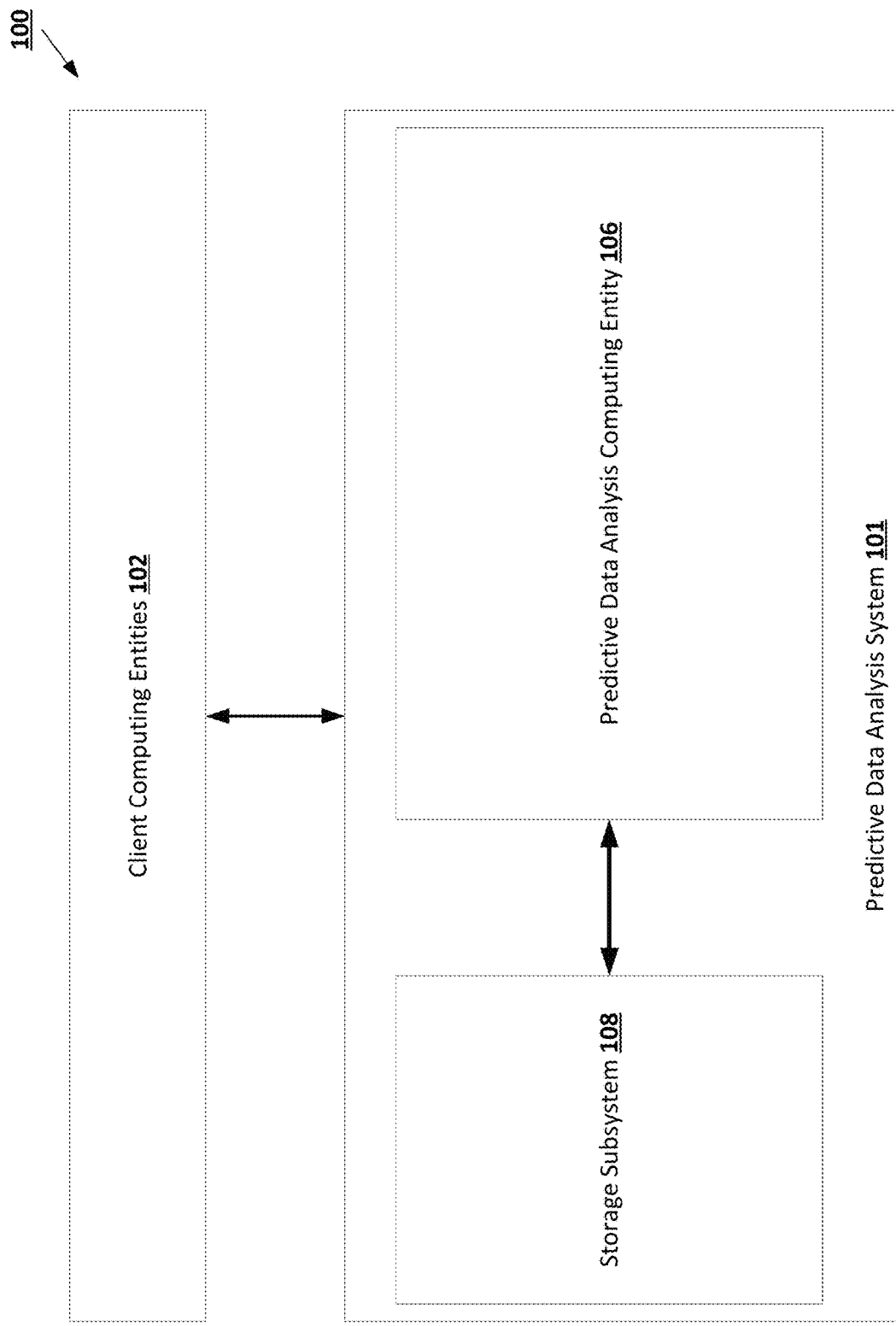

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
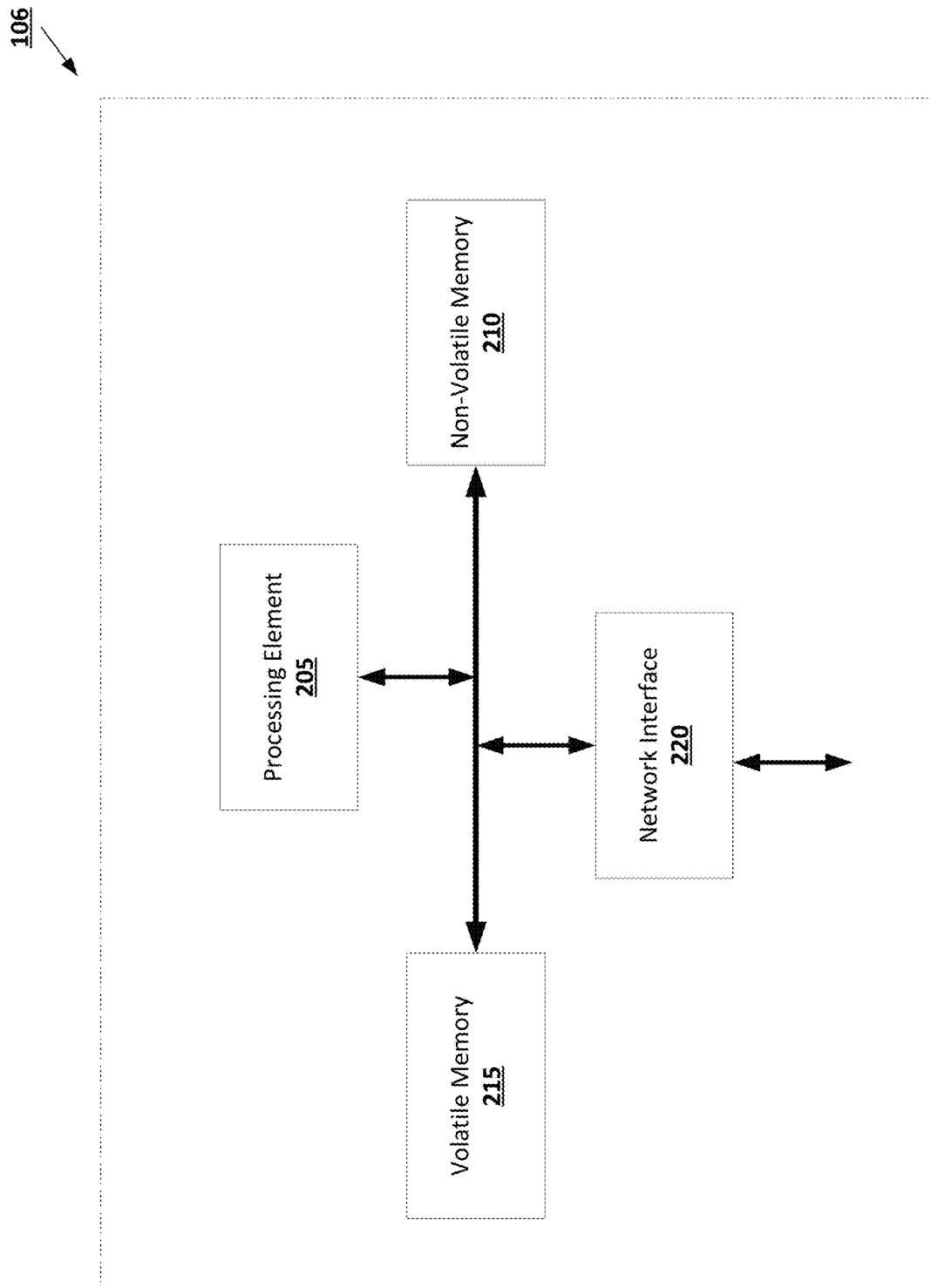

FIG. 2 provides an example predictive data analysis computing entity in accordance with some embodiments discussed herein.

Figure 3:
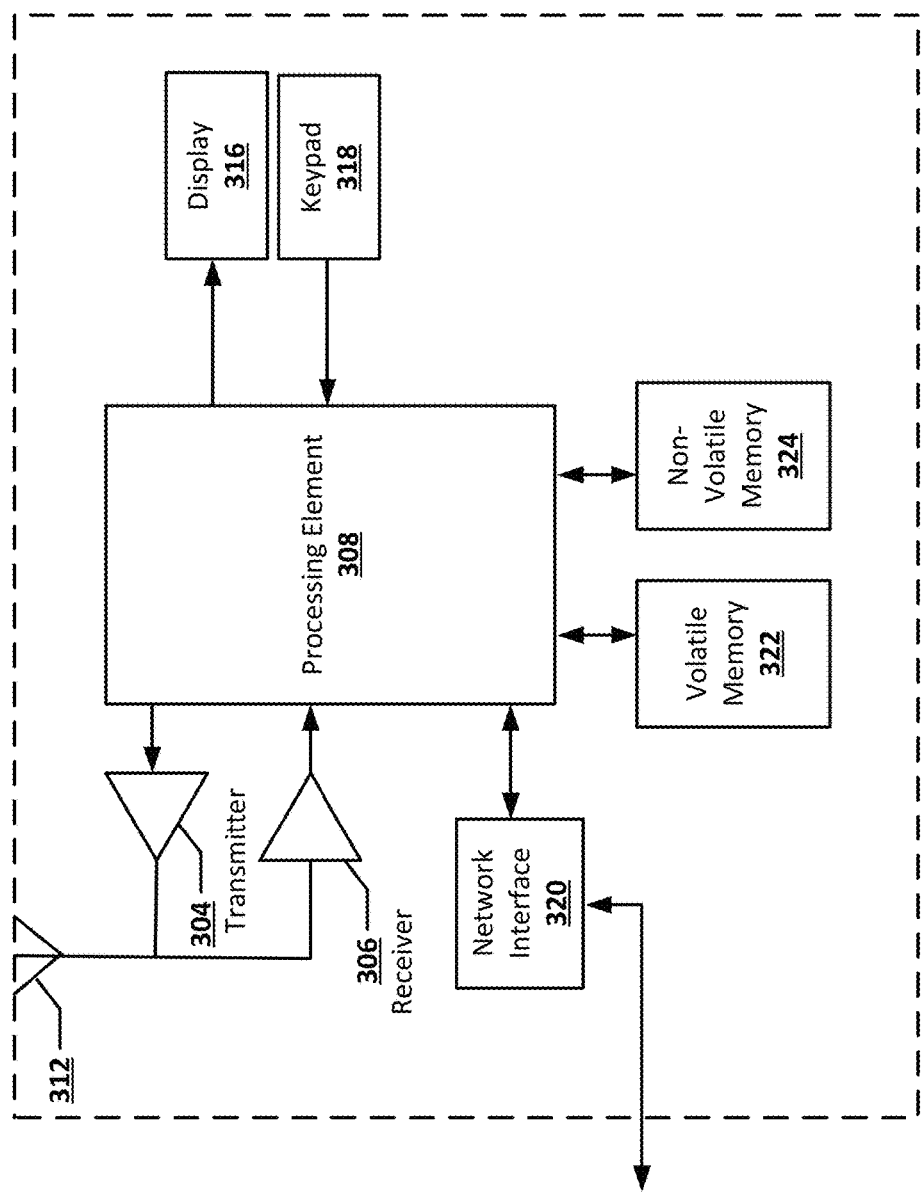

FIG. 3 provides an example client computing entity in accordance with some embodiments discussed herein.

Figure 4:
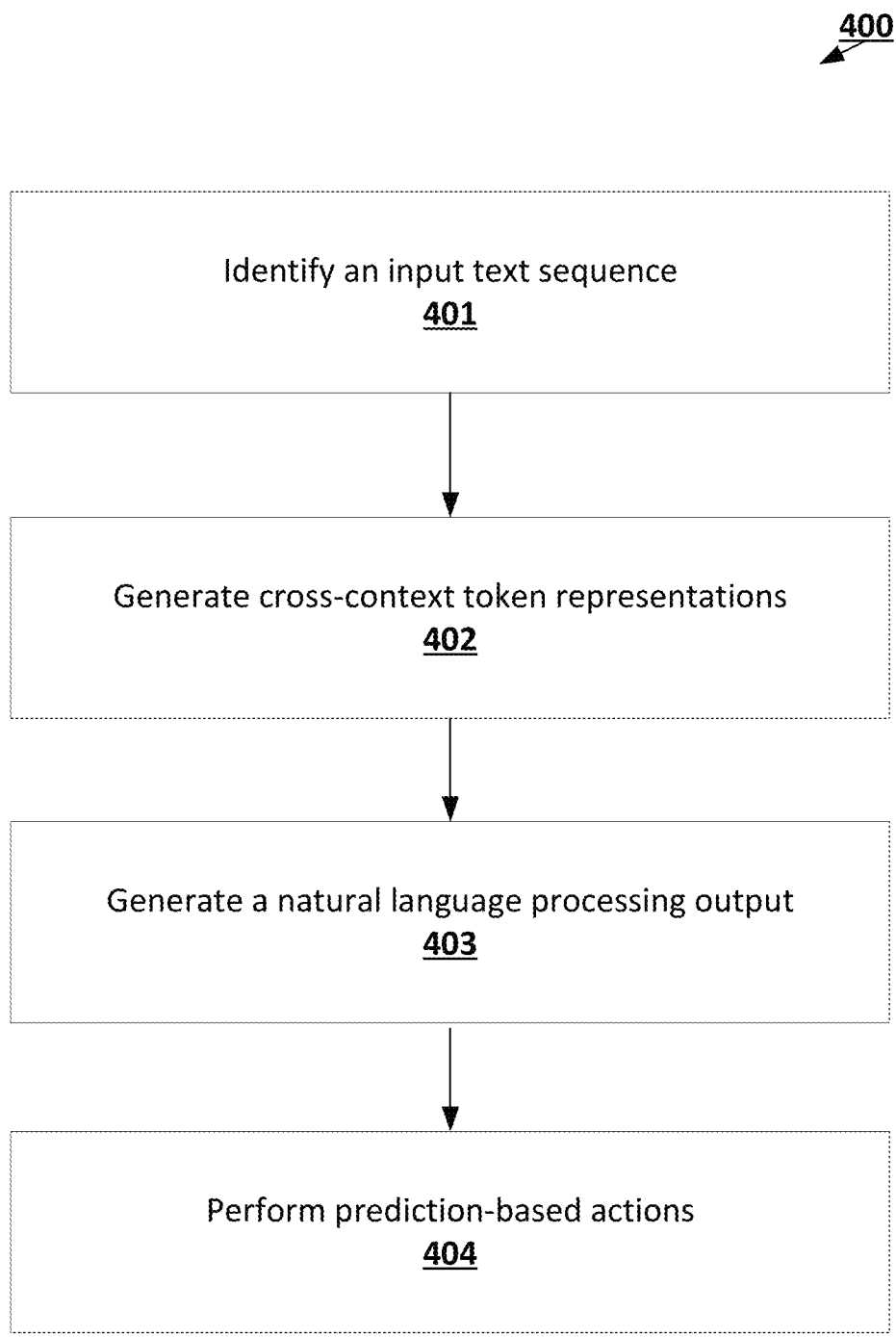

FIG. 4 is a flowchart diagram of an example process for performing natural language processing operations on an input text sequence comprising T input text tokens in accordance with some embodiments discussed herein.

FIG. 5 provides an operational example of an input text sequence in accordance with some embodiments discussed herein.

Figure 6:
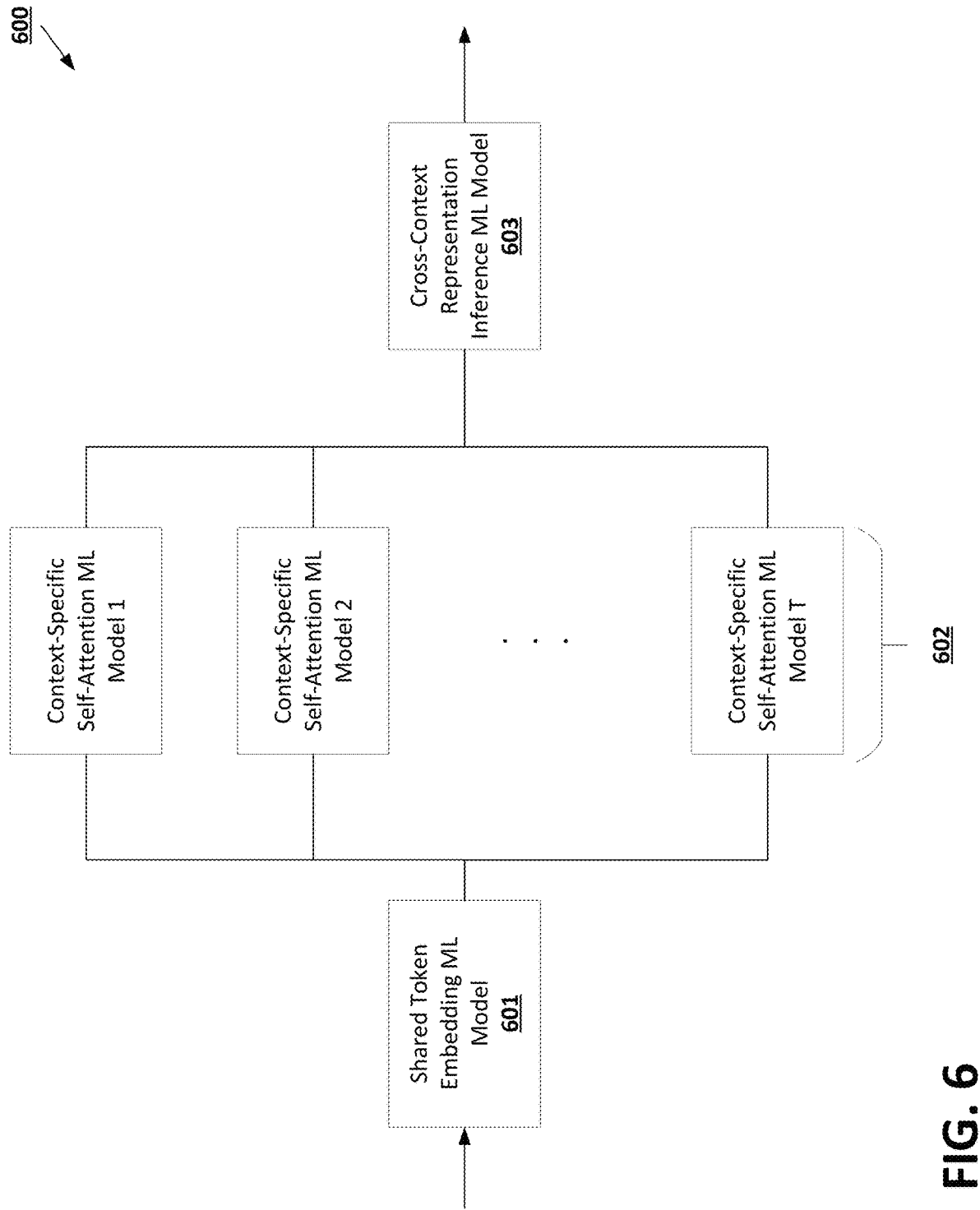

FIG. 6 provides an exemplary architecture for a multi-context self-attention machine learning framework in accordance with some embodiments discussed herein.

FIG. 7 provides an operational example of a prediction output user interface in accordance with some embodiments discussed herein.

Figure 8:
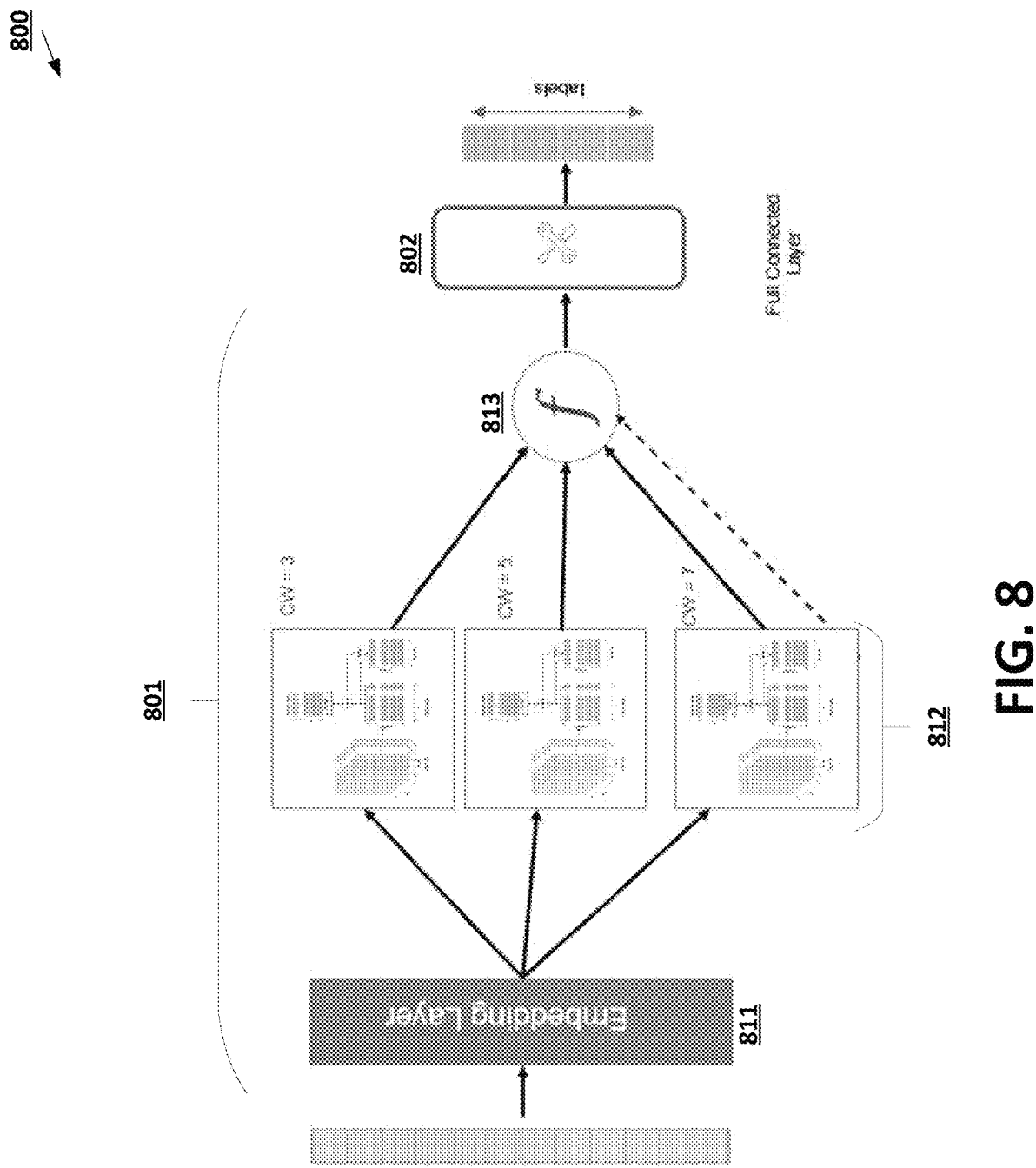

FIG. 8 provides an operational example of a machine learning pipeline with a multi-context self-attention machine learning framework in accordance with some embodiments discussed herein.

Figure 9:
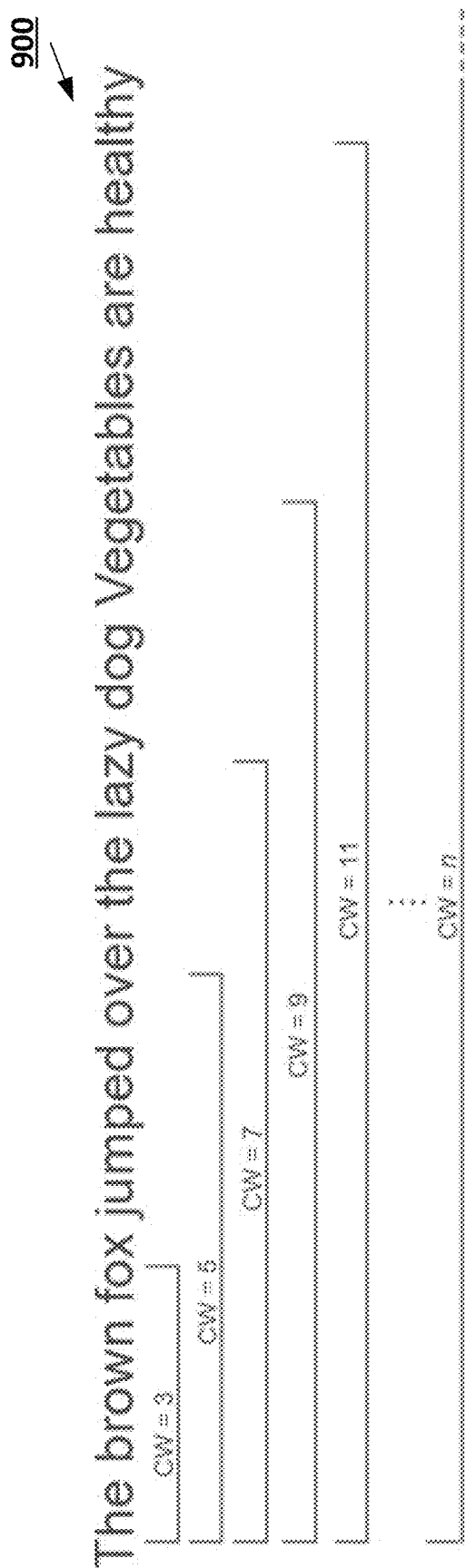

FIG. 9 provides an operational example of generating various context windows using an input text sequence in accordance with some embodiments discussed herein.

Figure 10:
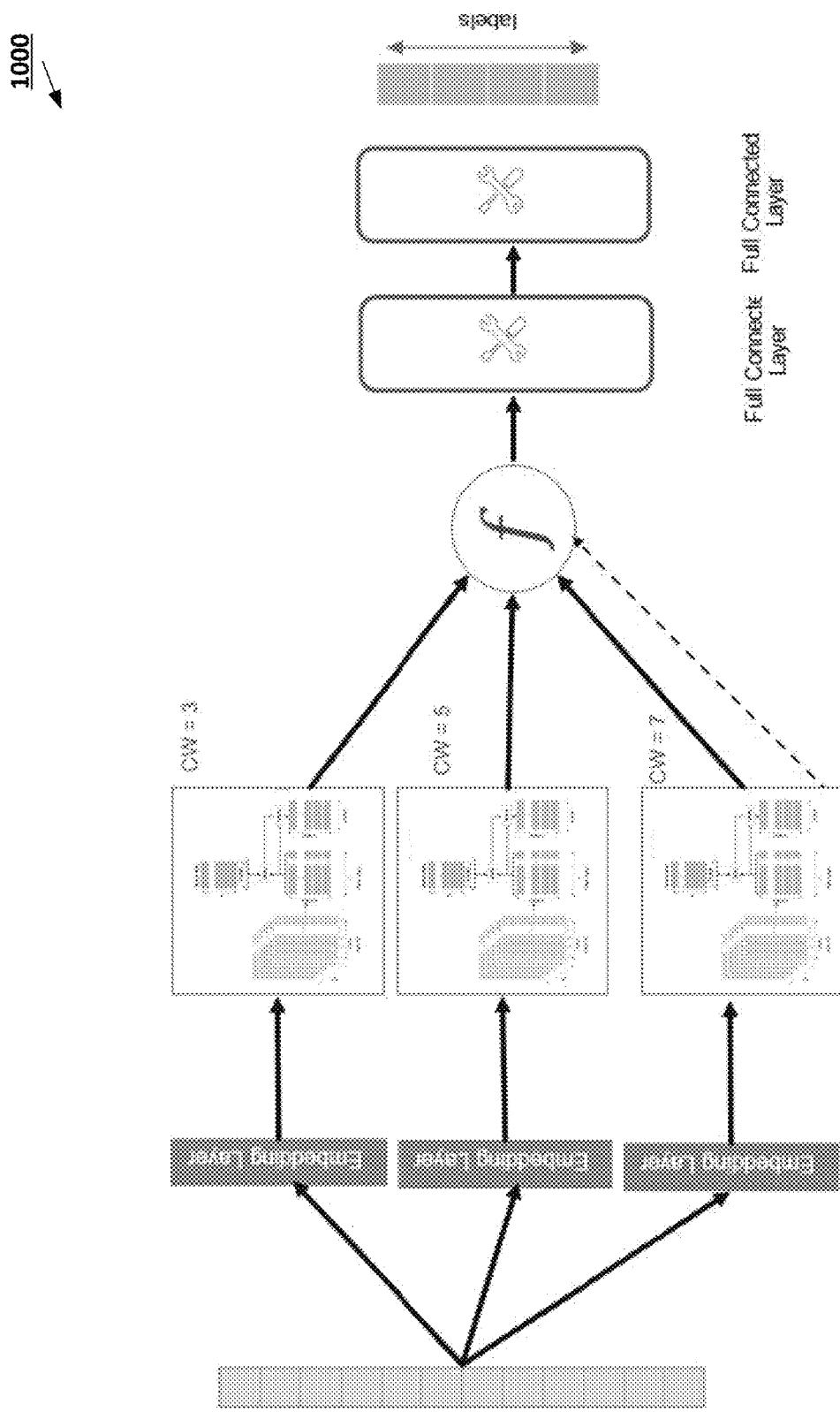

FIG. 10 provides an operational example of a machine learning pipeline with multi-context self-attention machine learning framework having C token embedding machine learning models in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

Various embodiments of the present invention make important technical contributions to improving predictive accuracy of natural language processing machine learning models, which in turn improves training speed and training efficiency of training natural language processing machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency Adaptive On-line Training for Fast and Accurate Natural Language Processing* in 40 (3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

For example, various embodiments of the present invention improve predictive accuracy of natural language processing machine learning models by using multi-context self-attention machine learning frameworks that use various distinct context window sizes to process an input text sequence. As described herein, an input text sequence may have a long size and/or may lack a requisite/sufficient ratio of separator tokens (e.g., dot tokens indicating sentence separations), either due to the semantic composition of the underlying texts and/or due to optical character recognition (OCR) errors. In some embodiments, the first of the noted features of some input text sequences (i.e., the long size of the input text sequences) makes it challenging to encode those input text sequences using text encoder machine learning models that are configured to process a fixed number of initial token representations, if the fixed input size falls below the size of the input text sequences. In some embodiments, the second feature of some input text sequences described in this paragraph (i.e., the insufficient ratio of separator tokens) makes it challenging to, when the fixed input size of a text encoder machine learning model falls below the size of the noted input sequences, divide the input text sequences into subsequences in a semantically informed manner. Collectively, the two noted features of some input text sequences (i.e., their long size and insufficient presence of separator tokens) make various fixed-input-size text encoder machine learning models unsuitable for encoding the noted input text sequences.

However, in accordance with various embodiments of the present invention, a using multi-context self-attention machine learning framework can use various distinct context window sizes to capture predictive insights about various potential segmenting/separation logics that can be imposed on an input text sequence. This technique will lead to higher accuracy of performing natural language processing operations on input sequences with long sizes and/or with insufficient presences of separator tokens. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

An exemplary application of various embodiments of the present invention relates to generating classifications or representations of text that account for the contextual and semantic meaning of the text. In some embodiments, a multi-context attention network model, or a CAN, processes a text token with different context windows to consider different possible interpretations of the text token. A key benefit of various embodiments of the present invention is the improved characterization of text in their intended meaning based at least in part on the context of the text. This improved accuracy of text classification or representation also enables improved accuracy in further text processing tasks, such as coding quality and risk scoring. In some embodiments, the following operations are performed: generating a first representation for each text token of a plurality of text tokens; providing the first representation for each text token to a plurality of neural network machine learning models each associated with a context window size and each configured to generate a second representation for each text token based at least in part on the associated context window size and using a local attention mechanism; generating a third representation for each text token using a global combination mechanism based at least in part on each second representation generated for the text token; and performing one or more automated actions for the plurality of text tokens using the third representation for each text token.

In some embodiments, a proposed architecture includes a plurality of neural network machine learning models, and each neural network machine learning model is associated with a different context window size. In the above figure specifically, one neural network machine learning model is associated with a context window size of three tokens, another neural network machine learning model is associated with a context window size of five tokens, and another neural network machine learning model is associated with a context window size of seven tokens. Each neural network machine learning model is configured to generate a second representation for each text token that encodes the relative importance of the text token within the context window size for the neural network machine learning model. It is understood that, for different context window sizes, a given text token may have different levels of importance or different meanings. Accordingly, if the given text token is captured in the wrong context at one neural network machine learning model (e.g., the context window includes text tokens from another sentence), the text token is appropriately represented with other context windows at other neural network machine learning models. Thus, using the plurality of neural network machine learning models, a given text token is interpreted with different contexts. In particular, each neural network machine learning model generates the second representation for each text token using a local attention mechanism, as shown in the below figure.

Moreover, various embodiments of the present invention make important technical contributions to improving resource-usage efficiency of post-prediction systems by using hybrid reason code predictions to set the number of allowed computing entities used by the noted post-prediction systems. For example, in some embodiments, a predictive data analysis computing entity determines D document classifications for D document data objects based at least in part on the D document-wide embedded representations for the D document data objects. Then, the count of document data objects that are associated with an affirmative document classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation: $R = \text{ceil}(\Sigma_k^{k=K} ur_k)$, where R is the predicted number of computing entities needed to perform post-prediction processing operations with respect to the D document data object, ceil(·) is a ceiling function that returns the closest integer that is greater than or equal to the value provided as the input parameter of the ceiling function, k is an index variable that iterates over K document data objects among the D document data that are associated with affirmative classifications, and $ur_k$ is the estimated resource utilization ratio for a kth document data object that may be determined based at least in part on a count of utterances/tokens/words in the kth document data object. In some embodiments, once R is generated, the predictive data analysis computing entity can use R to perform operational load balancing for a server system that is configured to perform post-prediction processing operations (e.g., automated investigation operations) with respect to D document data objects. This may be done by allocating computing entities to the post-prediction processing operations if the number of currently-allocated computing entities is below R, and deallocating currently-allocated computing entities if the number of currently-allocated computing entities is above R.

II. Definitions of Certain Terms

The term "input text sequence" may refer to a data construct that describes a sequential collection of text data, such as a collection of text data that is generated based at least in part on the output of performing optical character recognition (OCR) on one or more scanned page images, such as one or more scanned page images obtained by scanning one or more clinical document pages. An input text sequence may comprise a set of input text tokens, where an input text token may be a portion of the text data in the input text sequence that is supplied as an input unit to the multi-context self-attention machine learning framework. For example, in some embodiments, the T input text tokens of the input text sequence comprise the words of the input text sequence. As another example, in some embodiments, the T input text tokens of the input text sequence comprise the sentences of the input text sequence. As a further example, in some embodiments, the T input text tokens of the input text sequence comprise the paragraphs of the input text sequence. In some embodiments, when the T input text tokens of the input text sequence comprise the words of the input text sequence, the T input text tokens further comprise separator tokens (e.g., end-of-sentence separator tokens) that indicate which word tokens belong to a common sentence.

The term "multi-context self-attention machine learning framework" may refer to a data construct that describes parameters, hyperparameters, and/or defined operations of a machine learning model that is configured to process an input text sequence having T input text tokens using a set of C attention mechanisms each associated with a distinct context window size to generate a cross-context token representation for the input text sequence. In some embodiments, once generated, the T cross-context token representations generated by the multi-context self-attention machine learning framework are processed using a natural language processing machine learning model to generate a natural language output (e.g., an inferred text classification) for the input text sequence. In some embodiments, the multi-context self-attention machine learning framework and the natural language processing machine learning model are trained in an end-to-end manner and based at least in part on ground-truth natural language outputs (e.g., ground-truth text classifications, ground-truth text translations/summarizations, and/or the like) for a set of training input text sequences, such as ground-truth natural language outputs determined based at least in part on subject matter annotations and/or ground-truth natural language outputs determined based at least in part on historical end-user-assigned labels for particular text documents. In some embodiments, inputs to a multi-context self-attention machine learning framework include T vectors each describing a sequence of characters of an input text token. In some embodiments, outputs of a multi-context self-attention machine learning framework include T vectors each describing a cross-context token representation for an input text token. In some embodiments, a multi-context self-attention machine learning framework comprises: (i) a shared token embedding machine learning model that is configured to generate an initial token embedding for each of the T input text tokens of an input text sequence, and (ii) a set of C context-specific self-attention machine learning models each configured to process the T initial token embeddings using an attention mechanism characterized by a distinct context window size to generate, for each input text token of the T input text tokens of the input text sequence, a context-specific token representation. Accordingly, in some embodiments, after performing the operations of the shared token embedding machine learning model and the C context-specific self-attention machine learning models, T*C context-specific token embeddings are generated, with each input text token being associated with C context-specific token embeddings. In some embodiments, the multi-context self-attention machine learning framework further comprises a cross-context representation inference machine learning model that is configured to, for each input text token of the T input text tokens of the input text sequence, process the C context-specific token embeddings for the input text token to generate the cross-context token representation for the input text token. Accordingly, after performing the operations of the cross-context representation inference machine learning model, T cross-context token representations are generated, with each input text token being associated with a respective cross-context token representation.

The term "shared token embedding machine learning model" may refer to a data construct that describes parameters, hyperparameters, and/or defined operations of a machine learning model that is configured to generate, for each input text token, a fixed-size representation that is herein referred to as an initial token embedding. For example, in some embodiments, the shared token embedding machine learning model is configured to generate a one-hot-encoded representation for an input text token that corresponds to a word. As another example, in some embodiments, the shared token embedding machine learning model is configured to generate a Word2Vec representation for an input text token that corresponds to a word. As yet another example, in some embodiments, the shared token embedding machine learning model is configured to generate a Paragraph2Vec representation for an input text token that corresponds to a sentence. As a further example, in some embodiments, the shared token embedding machine learning model is configured to generate a Paragraph2Vec representation for an input text token that corresponds to a paragraph. In some embodiments, inputs to the shared token embedding machine learning model comprise one or more vectors describing an input text token, such as a vector describing a sequence of characters of an input text token that corresponds to a word, a sequence of vectors describing a sequence of word-wise representations of words of an input text token that corresponds to a sentence, a sequence of vectors describing a sequence of word-wise representations of words of an input text token that corresponds to a paragraph, and/or the like. In some embodiments, outputs of the shared token embedding machine learning model comprise a vector describing the fixed-size initial token embedding of the input text token. In some embodiments, like other components of a multi-context self-attention machine learning framework, the shared token embedding machine learning model is trained in an end-to-end manner and based at least in part on ground-truth natural language outputs (e.g., ground-truth text classifications) for a set of training input text sequences, such as ground-truth natural language outputs determined based at least in part on subject matter annotations and/or ground-truth natural language outputs determined based at least in part on historical end-user-assigned labels for particular text documents.

The term "context-specific self-attention machine learning model" may refer to a data construct that describes parameters, hyperparameters, and/or defined operations of a machine learning model that is configured to process initial token representations for a set of input text tokens in accordance with a self-attention mechanism to generate, for each input text token, a context-specific token representation. In some embodiments, the self-attention mechanism of a context-specific self-attention machine learning model generates a context-specific token representation for a particular input text token in a set of input text tokens based at least in part on a set of attention weights associated with the context-specific self-attention machine learning model, where in some embodiments each attention weight: (i) is associated with a pair of input text tokens that are both associated with a common attention window and/or with a common convolutional kernel, and (ii) describes a predicted semantic relationship significance of the pair of input text tokens. In some embodiments, a context-specific self-attention machine learning model is a window-adaptive self-attention machine learning model. In some embodiments, inputs to a context-specific self-attention machine learning model include a set of initial token representations for a set of input text tokens (e.g., for an ith context-specific self-attention machine learning model, during each inferential iteration, ci initial token representations for ci input text tokens, where ci is the context window size for the ith context-specific self-attention machine learning model). In some embodiments, outputs of a context-specific self-attention machine learning model include, after processing the T initial token embeddings for the T input text tokens of an input text sequence, T vectors each describing a context-specific token representation of a respective input text token. As described above, given C context window sizes associated with a multi-context self-attention machine learning framework, C distinct context windows are allocated in a one-to-one manner to C context-specific self-attention machine learning models. For example, given C=3 where the three context window sizes includes 2, 3, and 4, then a first context-specific self-attention machine learning model may have a context window of 2 (i.e., c1=2), a second context-specific self-attention machine learning model may have a context window of 3 (i.e., c2=3), and a third context-specific self-attention machine learning model may have a context window of 4 (i.e., c3=4). However, while the C context window sizes in some embodiments have distinct context windows, they may have the same or different architectures.

The term "context window size" may refer to a data construct that describes a window size that can be used to determine which surrounding input text tokens of a particular input text tokens are assumed to have potential semantic relevance with respect to the particular input text token. In some embodiments, the context window size of a context-specific self-attention machine learning model describes a configuration hyperparameter of an attention mechanism of the context-specific self-attention machine learning model. In some embodiments, the context window size of a context-specific self-attention machine learning model describes a configuration hyperparameter of a non-attention mechanism (e.g., a convolutional mechanism) of the context-specific self-attention machine learning model that either provides input data to the attention mechanism of the context-specific self-attention machine learning model or performs operations on the output data of the attention mechanism of the context-specific self-attention machine learning model. In some embodiments, when a context-specific self-attention machine learning model is a Longformer machine learning model, the context window size for the noted context-specific self-attention machine learning model is the sliding window size hyperparameter of the noted context-specific self-attention machine learning model. In some embodiments, when a context-specific self-attention machine learning model is a hierarchical convolutional attention network machine learning model, the context window size for the noted context-specific self-attention machine learning model is the window size hyperparameter of the noted context-specific self-attention machine learning model. In some embodiments, when a context-specific self-attention machine learning model is an attention-based convolutional neural network machine learning model, the context window size for the noted context-specific self-attention machine learning model is the window size hyperparameter of the noted context-specific self-attention machine learning model.

The term "cross-context representation inference machine learning model" may refer to a data construct that describes parameters, hyperparameters, and/or defined operations of a machine learning model that is configured to process the context-specific token representations for an input sequence token to generate a cross-context token representation for the input text token. In some embodiments, the cross-context representation inference machine learning model is configured to generate the cross-context token representation for the input text token based at least in part on a statistical distribution measure (e.g., an average) of the context-specific token representations for the input sequence token. In some embodiments, the cross-context representation inference machine learning model is configured to generate the cross-context token representation for the input text token based at least in part on the output of concatenation of the context-specific token representations for the input sequence token. In some embodiments, inputs to the cross-context representation inference machine learning model include a set of T vectors each describing a context-specific token representation for a particular input text token, while outputs of the cross-context representation inference machine learning model include a vector describing the cross-context token representation for the particular input text token. In some embodiments, like other components of a multi-context self-attention machine learning framework, the cross-context representation inference machine learning model is trained in an end-to-end manner and based at least in part on ground-truth natural language outputs (e.g., ground-truth text classifications) for a set of training input text sequences, such as ground-truth natural language outputs determined based at least in part on subject matter annotations and/or ground-truth natural language outputs determined based at least in part on historical end-user-assigned labels for particular text documents. In some embodiments, the cross-context representation inference machine learning model is configured to, for each input text token: (i) generate a convolutional representation of the input text token based at least in part on applying a convolutional operation on each context-specific token representation for the input text token, and (ii) generate the cross-context token representation for the input text token based at least in part on applying a pooling operation on the convolutional representation. In some embodiments, the cross-context representation inference machine learning model is configured to, for each input text token: (i) generate a sequence representation for the input text token using an attention-based machine learning model and based at least in part on each context-specific token representation for the input text token, and (ii) generate the cross-context token representation for the input text token based at least in part on the sequence representation.

The term "natural language processing machine learning model" may refer to a data construct that describes parameters, hyperparameters, and/or defined operations of a machine learning model that is configured to process cross-context token representations for at least some of the input text tokens of an input text token to generate a natural language processing output for the input text token. For example, the natural language processing machine learning model may be configured to process T cross-context token representations for T input text tokens of an input text token to generate a natural language processing output that describes, for each of the T input text tokens, a token score that describes a predicted significance of the input text token to the semantic context of the input text sequence. As another example, the natural language processing machine learning model may be configured to process the cross-context token representation for a particular input text token to generate a token-wise classification for the particular input text token, such as a token-wise classification that describes a predicted likelihood that the particular input text token is a keyword. As yet another example, given a first input text sequence comprising $T_1$ input text tokens and a second input text sequence comprising $T_2$ input text tokens, the natural language processing machine learning model may be configured to generate a similarity score for the two input text sequences based at least in part on $T_1*T_2$ similarity scores each being the similarity score between a cross-context token representation for an input text token of the first input text sequence and a cross-context token representation for an input text token of the second input text sequence. As a further example, the natural language processing machine learning model may be configured to process T cross-context token representations for T input text tokens of an input text token to generate a natural language processing output that describes a predicted translation and/or a predicted summarization of the input text sequence. As another example, the natural language processing machine learning model may be configured to process T cross-context token representations for T input text tokens of an input text token to generate a sequence-wise classification for the input text sequence, such as a sequence-wise classification that describes a predicted subject matter of the input text sequence. In some embodiments, inputs to the natural language processing machine learning model include a vector comprising a cross-context token representation for a particular input text token. In some embodiments, inputs to the natural language processing machine learning model include a matrix comprising two or more cross-token representations for two or more input text tokens of an input text sequence, such as a matrix comprising all of the T cross-token representations of all of the T input text tokens of the input text sequence. In some embodiments, outputs of the natural language processing machine learning model include an atomic value, a vector, and/or a sequence of vectors describing the natural language processing output that is generated by the natural language processing machine learning model, such as an atomic value describing a predicted similarity score of two input text tokens, a vector describing T predicted token scores of the T input text tokens of the input text sequence, and a sequence of vectors describing a translation/summarization of an input text sequence.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

An example of a prediction-based action that can be performed using the predictive data analysis system 101 is a request for generating a diagnosis code for a clinical text. For example, in accordance with various embodiments of the present invention, a using multi-context self-attention machine learning framework can use various distinct context window sizes to capture predictive insights about various potential segmenting/separation logics that can be imposed on an input text sequence. This technique will lead to higher accuracy of performing natural language processing operations on input sequences with long sizes and/or with insufficient presences of separator tokens. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal-Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention make important technical contributions to improving predictive accuracy of natural language processing machine learning models, which in turn improves training speed and training efficiency of training natural language processing machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency Adaptive On-line Training for Fast and Accurate Natural Language Processing* in 40 (3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

FIG. 4 is a flowchart diagram of an example process 400 for performing natural language processing operations on an input text sequence comprising T input text tokens. Via the various steps/operations of the process 400, the predictive data analysis computing entity 106 can use a multi-context self-attention machine learning framework to generate T cross-context token representations for the T input text tokens and use the T cross-context token representations to generate one or more natural language processing outputs each describing an inferred property of at least a subset of the T input text tokens.

The process 400 begins at step/operation 401 when the predictive data analysis computing entity 106 identifies the input text sequence. The input text sequence may include any sequential collection of text data, such as a collection of text data that is generated based at least in part on the output of performing optical character recognition (OCR) on one or more scanned page images, such as one or more scanned page images obtained by scanning one or more clinical document pages. An input text sequence may comprise a set of input text tokens, where an input text token may be a portion of the text data in the input text sequence that is supplied as an input unit to the multi-context self-attention machine learning framework. For example, in some embodiments, the T input text tokens of the input text sequence comprise the words of the input text sequence. As another example, in some embodiments, the T input text tokens of the input text sequence comprise the sentences of the input text sequence. As a further example, in some embodiments, the T input text tokens of the input text sequence comprise the paragraphs of the input text sequence. In some embodiments, when the T input text tokens of the input text sequence comprise the words of the input text sequence, the T input text tokens further comprise separator tokens (e.g., end-of-sentence separator tokens) that indicate which word tokens belong to a common sentence.

An operational example of an input text sequence 500 comprising a set of word tokens is depicted in FIG. 5. As depicted in FIG. 5, in some embodiments, an input text sequence may have a long size. Moreover, as further depicted in FIG. 5, in some embodiments, an input text sequence may lack a requisite/sufficient ratio of separator tokens (e.g., dot tokens indicating sentence separations), either due to the semantic composition of the underlying texts and/or due to OCR errors. In some embodiments, the first of the noted features of some input text sequences (i.e., the long size of the input text sequences) makes it challenging to encode those input text sequences using text encoder machine learning models that are configured to process a fixed number of initial token representations, if the fixed input size falls below the size of the input text sequences. In some embodiments, the second feature of some input text sequences described in this paragraph (i.e., the insufficient ratio of separator tokens) makes it challenging to, when the fixed input size of a text encoder machine learning model falls below the size of the noted input sequences, divide the input text sequences into subsequences in a semantically informed manner. Collectively, the two noted features of some input text sequences (i.e., their long size and insufficient presence of separator tokens) make various fixed-input-size text encoder machine learning models unsuitable for encoding the noted input text sequences.

However, as described herein, in accordance with various embodiments of the present invention, a using multi-context self-attention machine learning framework can use various distinct context window sizes to capture predictive insights about various potential segmenting/separation logics that can be imposed on an input text sequence. This technique will lead to higher accuracy of performing natural language processing operations on input sequences with long sizes and/or with insufficient presences of separator tokens. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

Returning to FIG. 4, at step/operation 402, the predictive data analysis computing entity 106 processes the input text sequence using a multi-context self-attention machine learning framework to generate, for each input text token of the input text sequence, a cross-context token representation. Accordingly, in some embodiments, via performing step/operation 402, the predictive data analysis computing entity 106 generates T cross-context token representations for the T input text tokens of the input text sequence.

In some embodiments, the multi-context self-attention machine learning framework is configured to process an input text sequence having T input text tokens using a set of C attention mechanisms each associated with a distinct context window size to generate a cross-context token representation for the input text sequence. In some embodiments, once generated, the T cross-context token representations generated by the multi-context self-attention machine learning framework are processed using a natural language processing machine learning model to generate a natural language output (e.g., an inferred text classification) for the input text sequence. In some embodiments, the multi-context self-attention machine learning framework and the natural language processing machine learning model are trained in an end-to-end manner and based at least in part on ground-truth natural language outputs (e.g., ground-truth text classifications, ground-truth text translations/summarizations, and/or the like) for a set of training input text sequences, such as ground-truth natural language outputs determined based at least in part on subject matter annotations and/or ground-truth natural language outputs determined based at least in part on historical end-user-assigned labels for particular text documents. In some embodiments, inputs to a multi-context self-attention machine learning framework include T vectors each describing a sequence of characters of an input text token. In some embodiments, outputs of a multi-context self-attention machine learning framework include T vectors each describing a cross-context token representation for an input text token.

In some embodiments, a multi-context self-attention machine learning framework comprises: (i) a shared token embedding machine learning model that is configured to generate an initial token embedding for each of the T input text tokens of an input text sequence, and (ii) a set of C context-specific self-attention machine learning models each configured to process the T initial token embeddings using an attention mechanism characterized by a distinct context window size to generate, for each input text token of the T input text tokens of the input text sequence, a context-specific token representation. Accordingly, in some embodiments, after performing the operations of the shared token embedding machine learning model and the C context-specific self-attention machine learning models, T*C context-specific token embeddings are generated, with each input text token being associated with C context-specific token embeddings. In some embodiments, the multi-context self-attention machine learning framework further comprises a cross-context representation inference machine learning model that is configured to, for each input text token of the T input text tokens of the input text sequence, process the C context-specific token embeddings for the input text token to generate the cross-context token representation for the input text token. Accordingly, after performing the operations of the cross-context representation inference machine learning model, T cross-context token representations are generated, with each input text token being associated with a respective cross-context token representation.

In some embodiments, the multi-context self-attention machine learning framework 600 has the architecture that is depicted in FIG. 6. As depicted in FIG. 6, the multi-context self-attention machine learning framework 600 comprises a shared token embedding machine learning model 601 that is configured to process the T input text tokens (i.e., input text tokens $w_1, w_2, \ldots, w_T$) of an input text sequence (i.e., the input text sequence w') to generate T initial token embeddings (i.e., initial token embeddings $x_1, x_2, \ldots, x_T$) of the input text sequence.

In some embodiments, a shared token embedding machine learning model is configured to generate, for each input text token, a fixed-size representation that is herein referred to as an initial token embedding. For example, in some embodiments, the shared token embedding machine learning model is configured to generate a one-hot-encoded representation for an input text token that corresponds to a word. As another example, in some embodiments, the shared token embedding machine learning model is configured to generate a Word2Vec representation for an input text token that corresponds to a word. As yet another example, in some embodiments, the shared token embedding machine learning model is configured to generate a Paragraph2Vec representation for an input text token that corresponds to a sentence. As a further example, in some embodiments, the shared token embedding machine learning model is configured to generate a Paragraph2Vec representation for an input text token that corresponds to a paragraph.

While various embodiments of the present invention describe generating all of the initial token embeddings provided to all of the context-specific self-attention machine learning models 602 using a shared token embedding machine learning model 601, a person of ordinary skill in the relevant technology will recognize that each context-specific self-attention machine learning model may use initial token embeddings generated by a separate token embedding machine learning model that is associated with the context-specific self-attention machine learning model. An operational example of a machine learning pipeline 1000 employing this proposed architecture is depicted in FIG. 10.

In some embodiments, inputs to the shared token embedding machine learning model comprise one or more vectors describing an input text token, such as a vector describing a sequence of characters of an input text token that corresponds to a word, a sequence of vectors describing a sequence of word-wise representations of words of an input text token that corresponds to a sentence, a sequence of vectors describing a sequence of word-wise representations of words of an input text token that corresponds to a paragraph, and/or the like. In some embodiments, outputs of the shared token embedding machine learning model comprise a vector describing the fixed-size initial token embedding of the input text token. In some embodiments, like other components of a multi-context self-attention machine learning framework, the shared token embedding machine learning model is trained in an end-to-end manner and based at least in part on ground-truth natural language outputs (e.g., ground-truth text classifications) for a set of training input text sequences, such as ground-truth natural language outputs determined based at least in part on subject matter annotations and/or ground-truth natural language outputs determined based at least in part on historical end-user-assigned labels for particular text documents.

As further depicted in FIG. 6, the multi-context self-attention machine learning framework 600 comprises a set of C context-specific self-attention machine learning models 602. In some embodiments, each ith context-specific self-attention machine learning model is configured to, for each jth input text token $w_j$ of the input text tokens $w_1, w_2, \ldots, w_T$: (i) identify a related subset of the initial token embeddings $x_1, x_2, \ldots, x_T$ (e.g., a subset of the initial token embeddings $x_1, x_2, \ldots, x_T$ that fall within a common attention window as the initial token embedding $x_j$ for the input text token $w_j$, a subset of the initial token embeddings $x_1, x_2, \ldots, x_T$ that fall within a common convolutional filter as the initial token embedding $x_j$ for the input text token $w_j$, all of the initial token embeddings $x_1, x_2, \ldots, x_T$, and/or the like), and (ii) process the related subset using a self-attention mechanism characterized by a distinct context window size $c_i$ that is associated with the ith context-specific self-attention machine learning model to generate a context-specific token representation $r_{i,j}$ for the jth input text token. Accordingly, after performing the operations of the C context-specific self-attention machine learning models 602, C*T context-specific token representations rub are generated for the input text sequence w, where a ranges over the C context-specific self-attention machine learning models and b ranges over the T input text tokens of the input text sequence w.

In some embodiments, a context-specific self-attention machine learning model is configured to process initial token representations for a set of input text tokens in accordance with a self-attention mechanism to generate, for each input text token, a context-specific token representation. In some embodiments, the self-attention mechanism of a context-specific self-attention machine learning model generates a context-specific token representation for a particular input text token in a set of input text tokens based at least in part on a set of attention weights associated with the context-specific self-attention machine learning model, where in some embodiments each attention weight: (i) is associated with a pair of input text tokens that are both associated with a common attention window and/or with a common convolutional kernel, and (ii) describes a predicted semantic relationship significance of the pair of input text tokens.

In some embodiments, a context-specific self-attention machine learning model is a window-adaptive self-attention machine learning model. A window-adaptive self-attention machine learning model may be a machine learning model that is configured to process a set of token embeddings (e.g., a set of initial token embeddings as described herein) for a set of input text tokens using an attention mechanism that is associated with a context window size, where the context window size is a hyperparameter of the window-adaptive self-attention machine learning model that may be provided by the developer-provided/designer-provided configuration data associated with the window-adaptive self-attention machine learning model. Examples of window-adaptive self-attention machine learning models are described in the below paragraph. However, a person of ordinary skill in the relevant technology will recognize that other window-adaptive self-attention machine learning models may be used in various embodiments of the present invention.

One example of a window-adaptive self-attention machine learning model is the Longformer machine learning model that is described in Beltagy et al., *Longformer: The Long-Document Transformer*, arXiv: 2004.05150 [cs.CL] (2020), available online at https://arxiv.org/abs/2004.05150. As described in Beltagy, the Longformer machine learning model has a sliding window size of w that may be defined by hyperparameters of the Longfrormer machine learning model. In some embodiments, when a Longformer machine learning model is utilized as a context-specific self-attention machine learning model having a distinct context window size, the w hyper-parameter of the Longfrormer machine learning model is set to the distinct context window size.

Another example of a window-adaptive self-attention machine learning model is the hierarchical convolutional attention network machine learning model that is described in Gao et al., *Hierarchical Convolutional Attention Networks for Text Classification*, Proceedings of The Third Workshop on Representation Learning for Natural Language Processing in Melbourne, Australia (2018), available online at https://www.osti.gov/servlets/purl/1471854. As described in Gao, the hierarchical convolutional attention network machine learning model has a window size which may be set by a hyper-parameter of the hierarchical convolutional attention network machine learning model, and which has been set to three in the implementation that is described in Gao. In some embodiments, when a hierarchical convolutional attention network machine learning model is utilized as a context-specific self-attention machine learning model having a distinct context window size, the window size hyper-parameter of the hierarchical convolutional attention network machine learning model is set to the distinct context window size.

Other examples of window-adaptive self-attention machine learning models include self-attention variations of the attention-based convolutional neural network machine learning models that are described in Yin et al., *ABCNN: Attention-Based Convolutional Neural Network for Modeling Sentence Pairs*, arXiv: 1512.05193 [cs. CL] (2018), available online at https://arxiv.org/abs/1512.05193. As described in Yin, each proposed attention-based convolutional neural network machine learning model includes one or more convolutional mechanisms each characterized by a kernel width that may be set by a hyper-parameter of the noted attention-based convolutional neural network machine learning model. In some embodiments, when an attention-based convolutional neural network machine learning model is utilized as a context-specific self-attention machine learning model having a distinct context window size, the kernel width of a first convolutional mechanism/operation of the attention-based convolutional neural network machine learning model is set based at least in part on the distinct context window size. In some embodiments, like other components of a multi-context self-attention machine learning framework, the context-specific self-attention machine learning models are trained in an end-to-end manner and based at least in part on ground-truth natural language outputs (e.g., ground-truth text classifications) for a set of training input text sequences, such as ground-truth natural language outputs determined based at least in part on subject matter annotations and/or ground-truth natural language outputs determined based at least in part on historical end-user-assigned labels for particular text documents.

The attention-based convolutional neural network machine learning models described in Yin include two different attention-based convolutional neural network machine learning models: a pre-convolution attention-based convolutional neural network machine learning model (referred to in Yin as ABCNN-1) and a post-convolution attention-based convolutional neural network machine learning model (referred to in Yin as ABCNN-2). In some embodiments, while the context-specific self-attention mechanism for a pre-convolution attention-based convolutional neural network machine learning model generates a convolutional input representation for a convolutional mechanism characterized by a respective filter width based at least in part on an attention weight matrix for an input text sequence and a representation feature map comprising each initial token representation, the context-specific self-attention mechanism for a post-convolution attention-based convolutional neural network machine learning model generates an attention-based average pooling representation for an input text sequence based at least in part on an attention weight matrix for a convolutional representation of the input text sequence and the convolutional representation for the input text sequence. In some embodiments, when a pre-convolution attention-based convolutional neural network machine learning model is utilized as a context-specific self-attention machine learning model having a distinct context window size, the context-specific token representation generated by the particular pre-convolution attention-based convolutional neural network machine learning model for a particular input text token is determined based at least in part on a convolutional representation of the particular input text sequence that is generated by a convolutional mechanism based at least in part on a convolutional input representation for the convolutional mechanism. In some embodiments, when a post-convolution attention-based convolutional neural network machine learning model is utilized as a context-specific self-attention machine learning model having a distinct context window size, the context-specific token representation generated by the particular post-convolution attention-based convolutional neural network machine learning model for a particular input text token is determined based at least in part on the attention-based average pooling representation that is generated by the context-specific self-attention mechanism for the particular input text token.

In some embodiments, because the attention-based convolutional neural network machine learning models described in Yin utilize pairwise attention mechanisms, to use an attention-based convolutional neural network machine learning model as proposed in Yao as part of a multi-context self-attention machine learning framework that operates on a single input text sequence, two copies of the single input text sequence are provided as the input text sequence pair to the attention-based convolutional neural network machine learning model, and the desired output representations (e.g., convolutional representations, attention-based average pooling representations, and/or the like) for at least one of the two copies are used to generate the output context-specific token representation of the single input text sequence.

In some embodiments, inputs to a context-specific self-attention machine learning model include a set of initial token representations for a set of input text tokens (e.g., for an ith context-specific self-attention machine learning model, during each inferential iteration, $c_i$ initial token representations for $c_i$ input text tokens, where $c_i$ is the context window size for the ith context-specific self-attention machine learning model). In some embodiments, outputs of a context-specific self-attention machine learning model include, after processing the T initial token embeddings for the T input text tokens of an input text sequence, T vectors each describing a context-specific token representation of a respective input text token.

As described above, given C context window sizes associated with a multi-context self-attention machine learning framework, C distinct context windows are allocated in a one-to-one manner to C context-specific self-attention machine learning models. For example, given C=3 where the three context window sizes includes 2, 3, and 4, then a first context-specific self-attention machine learning model may have a context window of 2 (i.e., $c_1$=2), a second context-specific self-attention machine learning model may have a context window of 3 (i.e., $c_2$=3), and a third context-specific self-attention machine learning model may have a context window of 4 (i.e., $c_3$=4). However, while the C context window sizes in some embodiments have distinct context windows, they may have the same or different architectures.

For example, given C=3 where the three context window sizes includes 2, 3, and 4, if a first context-specific self-attention machine learning model has a context window of 2 (i.e., c)=2), a second context-specific self-attention machine learning model has a context window of 3 (i.e., $c_2$=3), and a third context-specific self-attention machine learning model has a context window of 4 (i.e., $c_3$=4), then the first context-specific self-attention machine learning model may be a Longformer machine learning model, the second context-specific self-attention machine learning model may be a hierarchical convolutional attention network machine learning model, and the third context-specific self-attention machine learning model may be a pre-convolution attention-based convolutional neural network machine learning model. In some embodiments, in the noted example, the first context-specific self-attention machine learning model may have a sliding window size of two, the second context-specific self-attention machine learning model may have a window size of three, and the third context-specific self-attention machine learning model may have a kernel width of four.

As another example, given C=3 where the three context window sizes includes 2, 3, and 4, if a first context-specific self-attention machine learning model has a context window of 2 (i.e., $c_1$=2), a second context-specific self-attention machine learning model has a context window of 3 (i.e., $c_2$=3), and a third context-specific self-attention machine learning model has a context window of 4 (i.e., $c_3$=4), then the first context-specific self-attention machine learning model may be a Longformer machine learning model, the second context-specific self-attention machine learning model may be a first post-convolution attention-based convolutional neural network machine learning model, and the third context-specific self-attention machine learning model may be a second post-convolution attention-based convolutional neural network machine learning model. In some embodiments, in the noted example, the first context-specific self-attention machine learning model may have a sliding window size of two, the second context-specific self-attention machine learning model may have a kernel width of three, and the third context-specific self-attention machine learning model may have a kernel width of four.

As a further another example, given C=3 where the three context window sizes includes 2, 3, and 4, if a first context-specific self-attention machine learning model has a context window of 2 (i.e., $c_1=2$), a second context-specific self-attention machine learning model has a context window of 3 (i.e., $c_2=3$), and a third context-specific self-attention machine learning model has a context window of 4 (i.e., $c_3=4$), then the first context-specific self-attention machine learning model may be a first Longformer machine learning model, the second context-specific self-attention machine learning model may be a second Longformer machine learning model, and the third context-specific self-attention machine learning model may be a third Longformer machine learning model. In some embodiments, in the noted example, the first context-specific self-attention machine learning model may have a sliding window size of two, the second context-specific self-attention machine learning model may have a sliding window size of three, and the third context-specific self-attention machine learning model may have a sliding window size of four.

Accordingly, in some embodiments, given M candidate window-adaptive self-attention machine learning model architectures, and given C context window sizes, a multi-context self-attention network machine learning framework may be designed in accordance with one of at least C*M potential architectures. For example, given C=2, and M=2: (i) in a first potential architecture, a machine learning model that has the $M_1$ architecture is associated with a context window size of $c_1$ and another machine learning model that has the $M_1$ architecture is associated with a context window size of $c_2$, (ii) in a second potential architecture, a machine learning model that has the $M_1$ architecture is associated with a context window size of $c_1$ and a machine learning model that has the $M_2$ architecture is associated with a context window size of $c_2$, (iii) in a third potential architecture, a machine learning model that has the $M_2$ architecture is associated with a context window size of $c_1$ and a machine learning model that has the $M_1$ architecture is associated with a context window size of $c_2$, (iv) in a fourth potential architecture, a machine learning model that has the $M_2$ architecture is associated with a context window size of $c_1$ and another machine learning model that has the $M_2$ architecture is associated with a context window size of $c_2$. In this way, C*M (here, 2*2*4) candidate multi-context self-attention machine learning frameworks may be trained, where each candidate multi-context self-attention machine learning framework is associated with a unique assignment of the C distinct context window sizes to the M window-adaptive self-attention machine learning model architectures.

In some embodiments, generating the multi-context self-attention network machine learning framework comprises: (i) training C*M candidate multi-context self-attention machine learning frameworks, (ii) for each candidate multi-context self-attention machine learning framework, generating a validation score, and (iii) generating the multi-context self-attention network machine learning framework based at least in part on each validation score (e.g., adopting the candidate multi-context self-attention network machine learning framework having the highest validation score as the multi-context self-attention network machine learning framework). In some embodiments, each candidate multi-context self-attention network machine learning framework is associated with a respective potential architecture of the C*M potential architectures and comprises a shared token embedding layer, C context-specific self-attention machine learning models arranged in the manner described by the respective potential architecture, and a cross-context representation inference machine learning model. In some embodiments, to generate the validation score for a particular candidate multi-context self-attention network machine learning framework, the following operations are performed: (i) training a machine learning pipeline that comprises the particular candidate multi-context self-attention network machine learning framework followed by a natural language processing machine learning model, where the natural language is configured to process the cross-context token representations generated by the particular candidate multi-context self-attention machine learning framework for an input text sequence to generate a natural language processing output for the input text sequence, (ii) subsequent to training the machine learning pipeline, processing a set of validation input text sequences using the trained machine learning pipeline to generate a set of inferred natural language processing outputs for the set of validation input text sequences, (iii) computing an error measure based at least in part on deviation between the set of inferred natural language processing outputs for the set of validation input text sequences and a set of ground-truth natural language processing outputs for the set of validation input text sequences, and (iv) generating the validation score for the particular candidate multi-context self-attention network machine learning framework based at least in part on the error measure. In some embodiments, the set of ground-truth natural language outputs are determined based at least in part on subject matter annotations and/or on historical end-user-assigned labels for particular text documents.

In some embodiments, the M window-adaptive self-attention machine learning model architectures comprise one or more of a Longformer machine learning model architecture, a pre-convolution attention-based convolutional neural network machine learning model architecture, a post-convolution attention-based convolutional neural network machine learning model architecture, and a hierarchical convolutional attention network machine learning model architecture. In some embodiments, the M window-adaptive self-attention machine learning model architectures comprise one or more of a Longformer machine learning model architecture, an attention-based convolutional neural network machine learning model architecture, and a hierarchical convolutional attention network machine learning model architecture.

As described above, in some embodiments, each context-specific self-attention machine learning model is associated with a context window size that describes a window size that can be used to determine which surrounding input text tokens of a particular input text tokens are assumed to have potential semantic relevance with respect to the particular input text token. In some embodiments, the context window size of a context-specific self-attention machine learning model describes a configuration hyperparameter of an attention mechanism of the context-specific self-attention machine learning model. In some embodiments, the context window size of a context-specific self-attention machine learning model describes a configuration hyperparameter of a non-attention mechanism (e.g., a convolutional mechanism) of the context-specific self-attention machine learning model that either provides input data to the attention mechanism of the context-specific self-attention machine learning model or performs operations on the output data of the attention mechanism of the context-specific self-attention machine learning model. In some embodiments, when a context-specific self-attention machine learning model is a Longformer machine learning model, the context window size for the noted context-specific self-attention machine learning model is the sliding window size hyperparameter of the noted context-specific self-attention machine learning model. In some embodiments, when a context-specific self-attention machine learning model is a hierarchical convolutional attention network machine learning model, the context window size for the noted context-specific self-attention machine learning model is the window size hyperparameter of the noted context-specific self-attention machine learning model. In some embodiments, when a context-specific self-attention machine learning model is an attention-based convolutional neural network machine learning model, the context window size for the noted context-specific self-attention machine learning model is the window size hyperparameter of the noted context-specific self-attention machine learning model. An operational example of generating various context windows (CWs) using an input text sequence 901 is depicted in FIG. 9.

Returning to FIG. 6, the multi-context self-attention machine learning framework 600 comprises a cross-context representation inference machine learning model 603 that is configured to generate, for each input text token of the T input text tokens of the input text sequence, a cross-context token representation for the input text token based at least in part on the C context-specific token representations for the input text token. In some embodiments, for a jth input text token $w_j$ of the input text tokens $w_1, w_2, \ldots, w_T$ of the input text sequence, the cross-context representation inference machine learning model 603 processes all context-specific token representations $r_{a,j}$ (where a ranges over the C context-specific self-attention machine learning models that are associated with C distinct context window sizes) to generate a cross-context token representation $h_j$. Accordingly, in some embodiments, after performing operations of the cross-context representation inference machine learning model 603, T cross-context token representations are generated, with each cross-context token representation being associated with an input text token of the T input text tokens.

In some embodiments, the cross-context representation inference machine learning model is configured to process the context-specific token representations for an input sequence token to generate a cross-context token representation for the input text token. In some embodiments, the cross-context representation inference machine learning model is configured to generate the cross-context token representation for the input text token based at least in part on a statistical distribution measure (e.g., an average) of the context-specific token representations for the input sequence token. In some embodiments, the cross-context representation inference machine learning model is configured to generate the cross-context token representation for the input text token based at least in part on the output of concatenation of the context-specific token representations for the input sequence token. In some embodiments, inputs to the cross-context representation inference machine learning model include a set of T vectors each describing a context-specific token representation for a particular input text token, while outputs of the cross-context representation inference machine learning model include a vector describing the cross-context token representation for the particular input text token. In some embodiments, like other components of a multi-context self-attention machine learning framework, the cross-context representation inference machine learning model is trained in an end-to-end manner and based at least in part on ground-truth natural language outputs (e.g., ground-truth text classifications) for a set of training input text sequences, such as ground-truth natural language outputs determined based at least in part on subject matter annotations and/or ground-truth natural language outputs determined based at least in part on historical end-user-assigned labels for particular text documents.

In some embodiments, the cross-context representation inference machine learning model is configured to, for each input text token: (i) generate a convolutional representation of the input text token based at least in part on applying a convolutional operation on each context-specific token representation for the input text token, and (ii) generate the cross-context token representation for the input text token based at least in part on applying a pooling operation on the convolutional representation. For example, the cross-context representation inference machine learning model may generate a matrix that describes each context-specific token representation for an input text token. Then, the cross-context representation inference machine learning model may perform a two-dimensional convolutional operation on the matrix to generate a convolutional matrix, and then perform a pooling operation (e.g., a max pooling operation, an average pooling operation, and/or the like) on the convolutional matrix to generate a pooling output vector that is then adopted as the cross-context token representation for the input text token.

In some embodiments, the cross-context representation inference machine learning model is configured to, for each input text token: (i) generate a sequence representation for the input text token using an attention-based machine learning model and based at least in part on each context-specific token representation for the input text token, and (ii) generate the cross-context token representation for the input text token based at least in part on the sequence representation. For example, the cross-context representation inference machine learning model may be configured to process a sequence of input representations comprising a sequence of the C context-specific token representations for an input text token (e.g., a sequence generated based at least in part on an ascending order of context window sizes associated with the C context-specific token representations, a descending order of context window sizes associated with the C context-specific token representations, and/or the like) followed by an input representation for an end-of-sequence token using an attention-based machine learning model (e.g., a bidirectional attention-based machine learning model) to generate, for each input representation in the sequence of input representation, an attention-based representation. In some of the noted embodiments, the attention-based representation for the end-of-sequence token input representation is adopted as the sequence representation for the input text token and used to generate the cross-context token representation for the input text token.

Returning to FIG. 4, at step/operation 403, the predictive data analysis computing entity 106 generates, using a natural language processing machine learning model and based at least in part on the T cross-context token representations for the T input text tokens of the input text sequence, a natural language processing output for the input text sequence. In some embodiments, the natural language processing machine learning model is configured to perform one or more downstream natural language processing operations on an input text sequence based at least in part on the T cross-context token representations for the T input text tokens of the input text sequence. Examples of downstream natural language processing operations include sequence classification operations, token classification operations, sequence summarization operations, sequence translation operations, keyword identification operations, and/or the like.

In some embodiments, a natural language processing machine learning model is configured to process cross-context token representations for at least some of the input text tokens of an input text token to generate a natural language processing output for the input text token. For example, the natural language processing machine learning model may be configured to process T cross-context token representations for T input text tokens of an input text token to generate a natural language processing output that describes, for each of the T input text tokens, a token score that describes a predicted significance of the input text token to the semantic context of the input text sequence. As another example, the natural language processing machine learning model may be configured to process the cross-context token representation for a particular input text token to generate a token-wise classification for the particular input text token, such as a token-wise classification that describes a predicted likelihood that the particular input text token is a keyword. As yet another example, given a first input text sequence comprising $T_1$ input text tokens and a second input text sequence comprising $T_2$ input text tokens, the natural language processing machine learning model may be configured to generate a similarity score for the two input text sequences based at least in part on $T_1*T_2$ similarity scores each being the similarity score between a cross-context token representation for an input text token of the first input text sequence and a cross-context token representation for an input text token of the second input text sequence. As a further example, the natural language processing machine learning model may be configured to process T cross-context token representations for T input text tokens of an input text token to generate a natural language processing output that describes a predicted translation and/or a predicted summarization of the input text sequence. As another example, the natural language processing machine learning model may be configured to process T cross-context token representations for T input text tokens of an input text token to generate a sequence-wise classification for the input text sequence, such as a sequence-wise classification that describes a predicted subject matter of the input text sequence.

In some embodiments, inputs to the natural language processing machine learning model include a vector comprising a cross-context token representation for a particular input text token. In some embodiments, inputs to the natural language processing machine learning model include a matrix comprising two or more cross-token representations for two or more input text tokens of an input text sequence, such as a matrix comprising all of the T cross-token representations of all of the T input text tokens of the input text sequence. In some embodiments, outputs of the natural language processing machine learning model include an atomic value, a vector, and/or a sequence of vectors describing the natural language processing output that is generated by the natural language processing machine learning model, such as an atomic value describing a predicted similarity score of two input text tokens, a vector describing T predicted token scores of the T input text tokens of the input text sequence, and a sequence of vectors describing a translation/summarization of an input text sequence.

In some embodiments (e.g., in classification contexts), the natural language processing machine learning comprises one or more feedforward neural network layers. In some embodiments (e.g., in translation/summarization contexts), the natural language processing machine learning model comprises one or more recurrent neural network layers (e.g., one or more long short term memory recurrent neural network layers). In some embodiments, the multi-context self-attention machine learning framework and the natural language processing machine learning model are trained in an end-to-end manner and based at least in part on ground-truth natural language outputs (e.g., ground-truth text classifications) for a set of training input text sequences, such as ground-truth natural language outputs determined based at least in part on subject matter annotations and/or ground-truth natural language outputs determined based at least in part on historical end-user-assigned labels for particular text documents.

An operational example of a machine learning pipeline 800 that comprises a An operational example of a multi-context self-attention framework 801 and a natural language processing machine learning model 802 is depicted in FIG. 8. As depicted in FIG. 8, the multi-context self-attention framework 801 comprises a shared token embedding machine learning model 811, three context-specific self-attention machine learning models 812 each associated with a context window size (CW), and a cross-context representation inference machine learning model 813.

At step/operation 404, the predictive data analysis computing entity 106 performs one or more prediction-based actions based at least in part on the natural language output. In some embodiments, the input text sequence is an unlabeled document data object, the natural language output is a document classification/label for the unlabeled document data object, and the prediction-based actions are performed based at least in part on the classification/label. In some embodiments, performing the one or more prediction-based actions based at least in part on the label assignment for an unlabeled document data object includes displaying the one or more label assignment for an unlabeled document data objects using a prediction output user interface, such as the prediction output user interface 700 of FIG. 7. As depicted in FIG. 7, the prediction output user interface 700 displays a list of top diagnosis code labels for an input unlabeled document data object.

In some embodiments, performing the one or more prediction-based actions based at least in part on the label assignment for an unlabeled document data object includes generating a net promoter score (NPS) for the unlabeled document data object that describes an overall customer incident as expressed by the unlabeled document data object. In some embodiments, performing the one or more prediction-based actions based at least in part on the label assignment for an unlabeled document data object includes generating an NPS for a set of unlabeled document data objects, for example for all incident reports associated with an institution and/or for a recent subset of all incident reports associated with an institution. In some embodiments, performing the one or more prediction-based actions includes performing one or more automated corrective measures and/or one or more automated load balancing operations (e.g., one or more hospital load balancing operations) based at least in part on cross-institution NPSs and/or based at least in part on per-incident-report NPSs. For example, if a cross-institution NPS shows consistent suboptimal service in a particular department, a proposed system may allocate new staff members to the particular department. As another example, if a per-incident-report NPS indicates that a particular staff person associated with the incident report is suffering from network connectivity shortages, a proposed system may allocate a new networking device and/or a new computing device to the staff person.

In some embodiments, performing the prediction-based actions include performing load balancing operations for a post-prediction system. For example, various embodiments of the present invention make important technical contributions to improving resource-usage efficiency of post-prediction systems by using hybrid reason code predictions to set the number of allowed computing entities used by the noted post-prediction systems. For example, in some embodiments, a predictive data analysis computing entity determines D document classifications for D document data objects based at least in part on the D document-wide embedded representations for the D document data objects. Then, the count of document data objects that are associated with an affirmative document classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation:

$$R = \text{ceil}\left(\sum_{k}^{k=K} ur_k\right),$$

where R is the predicted number of computing entities needed to perform post-prediction processing operations with respect to the D document data object, ceil(·) is a ceiling function that returns the closest integer that is greater than or equal to the value provided as the input parameter of the ceiling function, k is an index variable that iterates over K document data objects among the D document data that are associated with affirmative classifications, and $ur_k$ is the estimated resource utilization ratio for a kth document data object that may be determined based at least in part on a count of utterances/tokens/words in the kth document data object. In some embodiments, once R is generated, the predictive data analysis computing entity can use R to perform operational load balancing for a server system that is configured to perform post-prediction processing operations (e.g., automated investigation operations) with respect to D document data objects. This may be done by allocating computing entities to the post-prediction processing operations if the number of currently-allocated computing entities is below R, and deallocating currently-allocated computing entities if the number of currently-allocated computing entities is above R.

Accordingly, as described above, various embodiments of the present invention make important technical contributions to improving predictive accuracy of natural language processing machine learning models, which in turn improves training speed and training efficiency of training natural language processing machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency Adaptive On-line Training for Fast and Accurate Natural Language Processing* in 40 (3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors and using a multi-context convolutional self-attention machine learning framework, a cross-context token representation based at least in part on an input text token of an input text sequence wherein:
the multi-context convolutional self-attention machine learning framework comprises a shared token embedding machine learning model, a plurality of context-specific self-attention machine learning models, and a cross-context representation inference machine learning model,
the shared token embedding machine learning model is configured to generate an initial token embedding for the input text token,
a context-specific self-attention machine learning model of the plurality of context-specific self-attention machine learning models is (a) associated with a distinct context window size of a plurality of distinct context window sizes, and (b) configured to generate a context-specific token representation for the input text token based at least in part on the initial token embedding, and
the cross-context representation inference machine learning model is configured to generate the cross-context token representation based at least in part on the context-specific token representation;

generating, by the one or more processors and a natural language processing machine learning model, a natural language processing output for the input text sequence based at least in part on the cross-context token representation; and initiating, by the one or more processors, the performance of one or more prediction-based actions based at least in part on the natural language processing output.

2. The computer-implemented method of claim 1, wherein:
the context-specific self-attention machine learning model comprises a Longformer machine learning model associated with a sliding window size, and
the distinct context window size of the context-specific self-attention machine learning model is determined based at least in part on the sliding window size for the Longformer machine learning model.

3. The computer-implemented method of claim 1, wherein:
the plurality of context-specific self-attention machine learning models comprises one or more attention-based convolutional neural networks (CNNs) that are respectively associated with a one or more filter widths, and
a distinct window size of an attention-based CNN of the one or more attention-based CNNs is determined based at least in part on a filter width of the one or more filter widths that corresponds to the attention-based CNN.

4. The computer-implemented method of claim 3, wherein:
the attention-based CNN comprises a pre-convolution attention-based CNN, and
the pre-convolution attention-based CNN receives a convolutional input representation associated with the filter width corresponding to the attention-based CNN.

5. The computer-implemented method of claim 3, wherein:
the attention-based CNN comprises a post-convolution attention-based CNN, and
the post-convolution attention-based CNN generates a convolutional representation that is transformed to an attention-based average pooling representation for the input text sequence.

6. The computer-implemented method of claim 1, wherein:
the context-specific self-attention machine learning model comprises a hierarchical convolutional attention network machine learning model associated with a window size, and
the distinct context window size of the context-specific self-attention machine learning model is determined based at least in part on the respective window size for the hierarchical convolutional attention network machine learning model.

7. The computer-implemented method of claim 1, wherein generating the multi-context convolutional self-attention machine learning framework comprises:
given C distinct context window sizes and M window-adaptive self-attention machine learning model architectures, training C*M candidate multi-context self-attention machine learning frameworks, wherein a candidate multi-context self-attention machine learning framework of the C*M candidate multi-context self-attention machine learning frameworks is associated with a unique assignment of the C distinct context window sizes to the M window-adaptive self-attention machine learning model architectures;
generating a validation score for the candidate multi-context self-attention machine learning framework; and
generating the multi-context convolutional self-attention machine learning framework based at least in part on the validation score.

8. The computer-implemented method of claim 7, wherein a window-adaptive self-attention machine learning model architecture of the M window-adaptive self-attention machine learning model architectures comprises at least one of a Longformer machine learning model architecture, a pre-convolution attention-based CNN architecture, a post-convolution attention-based CNN architecture, or a hierarchical convolutional attention network machine learning model architecture.

9. The computer-implemented method of claim 1, wherein the cross-context representation inference machine learning model is configured to:
generate a convolutional representation of the input text token based at least in part on applying a convolutional operation on the context-specific token representation for the input text token; and
generate the cross-context token representation for the input text token based at least in part on applying a pooling operation on the convolutional representation.

10. The computer-implemented method of claim 1, wherein the cross-context representation inference machine learning model is configured to:
generate a sequence representation for the input text token using an attention-based machine learning model and based at least in part on the context-specific token representation for the input text token; and
generate the cross-context token representation for the input text token based at least in part on the sequence representation.

11. A system comprising memory and one or more processors communicatively coupled to the memory, the one or more processors configured to:
generate, using a multi-context convolutional self-attention machine learning framework, a cross-context token representation based at least in part on an input text token of an input text sequence, wherein:
the multi-context convolutional self-attention machine learning framework comprises a shared token embedding machine learning model, a plurality of context-specific self-attention machine learning models, and a cross-context representation inference machine learning model,
the shared token embedding machine learning model is configured to generate an initial token embedding for the input text token,
a context-specific self-attention machine learning model of the plurality of context-specific self-attention machine learning models is (a) associated with a distinct context window size of a plurality of distinct context window sizes, and (b) configured to generate a context-specific token representation for the input text token based at least in part on the initial token embedding, and
the cross-context representation inference machine learning model is configured to generate the cross-context token representation based at least in part on the context-specific token representation;
generate, using a natural language processing machine learning model, a natural language processing output for the input text sequence based at least in part on the cross-context token representation; and initiate the performance of one or more prediction-based actions based at least in part on the natural language processing output.

12. The system of claim 11, wherein:
the context-specific self-attention machine learning model comprises a Longformer machine learning model associated with a sliding window size, and
the distinct context window size of the context-specific self-attention machine learning model is determined based at least in part on the sliding window size for the Longformer machine learning model.

13. The system of claim 11, wherein:
the plurality of context-specific self-attention machine learning models comprises one or more attention-based convolutional neural networks (CNNs) that are respectively associated with a one or more filter widths, and
a distinct context window size of an attention-based CNN of the one or more attention-based CNNs is determined based at least in part on a filter width of the one or more filter widths that corresponds to the attention-based CNN.

14. The system of claim 13, wherein:
the attention-based CNN comprises a pre-convolution attention-based CNN, and
the pre-convolution attention-based CNN receives a convolutional input representation associated with the filter width corresponding to the attention-based CNN.

15. The system of claim 13, wherein:
the attention-based CNN comprises a post-convolution attention-based CNN, and
the post-convolution attention-based CNN generates a convolutional representation that is transformed to an attention-based average pooling representation for the input text sequence.

16. The system of claim 11, wherein:
the context-specific self-attention machine learning model comprises a hierarchical convolutional attention network machine learning model associated with a window size, and
the distinct context window size of the context-specific self-attention machine learning model is determined based at least in part on the window size for the hierarchical convolutional attention network machine learning model.

17. The system of claim 11, wherein, to generate the multi-context convolutional self-attention machine learning framework, the one or more processors are further configured to:
given C distinct context window sizes and M window-adaptive self-attention machine learning model architectures, train C * M candidate multi-context self-attention machine learning frameworks, wherein a candidate multi-context self-attention machine learning framework of the C * M candidate multi-context self-attention machine learning frameworks is associated with a unique assignment of the C distinct context window sizes to the M window-adaptive self-attention machine learning model architectures;
generate a validation score for the candidate multi-context self-attention machine learning framework; and
generate the multi-context convolutional self-attention machine learning framework based at least in part on the validation score.

18. The system of claim 17, wherein a window-adaptive self-attention machine learning model architecture of the M window-adaptive self-attention machine learning model architectures comprises at least one of a Longformer machine learning model architecture, a pre-convolution attention-based CNN architecture, a post-convolution attention-based CNN architecture, or a hierarchical convolutional attention network machine learning model architecture.

19. The system of claim 11, wherein the cross-context representation inference machine learning model is configured to:
generate a convolutional representation of the input text token based at least in part on applying a convolutional operation on the context-specific token representation for the input text token; and
generate the cross-context token representation for the input text token based at least in part on applying a pooling operation on the convolutional representation.

20. One or more non-transitory computer-readable storage media including instructions that, when executed by one or more processors, cause the one or more processors to:
generate, using a multi-context convolutional self-attention machine learning framework, a cross-context token representation based at least in part on an input text token of an input text sequence, wherein:
the multi-context convolutional self-attention machine learning framework comprises a shared token embedding machine learning model, a plurality of context-specific self-attention machine learning models, and a cross-context representation inference machine learning model,
the shared token embedding machine learning model is configured to generate an initial token embedding for the input text token,
a context-specific self-attention machine learning model of the plurality of context-specific self-attention machine learning models is (a) associated with a distinct context window size of a plurality of distinct context window sizes, and (b) configured to generate a context-specific token representation for the input text token based at least in part on the initial token embedding, and
the cross-context representation inference machine learning model is configured to generate the cross-context token representation based at least in part on the context-specific token representation;
generate, using a natural language processing machine learning model, a natural language processing output for the input text sequence based at least in part on the cross-context token representation; and
initiate the performance of one or more prediction-based actions based at least in part on the natural language processing output.

* * * * *

UNITED STATES PATENT AND TRADEMARK OFFICE
CERTIFICATE OF CORRECTION

PATENT NO. : 12,217,001 B2  
APPLICATION NO. : 17/733522  
DATED : February 4, 2025  
INVENTOR(S) : Mostafa Bayomi et al.

It is certified that error appears in the above-identified patent and that said Letters Patent is hereby corrected as shown below:

In the Claims

In Column 35, Line 25, Claim 3, delete "distinct" and insert -- distinct context --, therefor.

In Column 35, Line 52, Claim 6, delete "the respective" and insert -- the --, therefor.

Signed and Sealed this  
Twenty-second Day of April, 2025

Coke Morgan Stewart  
*Acting Director of the United States Patent and Trademark Office*